United States Patent
Kelly et al.

(10) Patent No.: US 12,353,915 B2
(45) Date of Patent: Jul. 8, 2025

(54) SYSTEM AND METHOD FOR MULTI-SCHEME ALLOCATION OF VIRTUAL RESOURCES IN AN INFORMATION HANDLING SYSTEM

(71) Applicant: Dell Products L.P., Round Rock, TX (US)

(72) Inventors: John Kelly, Mallow (IE); Dharmesh M. Patel, Round Rock, TX (US); Nicholas C. Busick, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 848 days.

(21) Appl. No.: 17/576,138

(22) Filed: Jan. 14, 2022

(65) Prior Publication Data

US 2023/0229520 A1  Jul. 20, 2023

(51) Int. Cl.
*G06F 9/50* (2006.01)
*G06F 9/455* (2018.01)

(52) U.S. Cl.
CPC ........ *G06F 9/5027* (2013.01); *G06F 9/45558* (2013.01); *G06F 9/5077* (2013.01); *G06F 2009/45562* (2013.01); *G06F 2009/4557* (2013.01)

(58) Field of Classification Search
CPC .. G06F 9/5077; G06F 9/5005; G06F 9/45558; G06F 2009/45562; G06F 2009/4557
See application file for complete search history.

(56) References Cited

U.S. PATENT DOCUMENTS

| | | | |
|---|---|---|---|
| 2008/0155100 A1* | 6/2008 | Ahmed | G06F 9/5061 709/226 |
| 2012/0233668 A1* | 9/2012 | Leafe | G06F 9/44526 726/4 |
| 2014/0173620 A1* | 6/2014 | Chai | G06F 9/5027 718/104 |
| 2019/0155660 A1* | 5/2019 | McQuighan | G06F 9/5022 |

\* cited by examiner

*Primary Examiner* — Jacob D Dascomb
(74) *Attorney, Agent, or Firm* — Chamberlain, Hrdlicka, White, Williams & Aughtry; Aly Z. Dossa (57) ABSTRACT

A method for managing specialized hardware resources includes obtaining, by a multi-scheme virtual allocation agent, a request for allocating a plurality of virtual resources to the specialized hardware resources in an information handling system, wherein the request specifies a first scheme of allocation, wherein the information handling system operates in a second scheme of allocation that is different from the first scheme of allocation, in response to the request: installing a first virtual resource of the plurality of virtual resources on a first specialized hardware resource of the specialized hardware resources, performing a dummy virtual resource installation to install a plurality of dummy variables based on the second scheme, installing a second virtual resource of the plurality of virtual resources on a second specialized hardware resource of the specialized hardware resources based on the second scheme, and deleting the plurality of dummy virtual resources from the hardware resources.

17 Claims, 10 Drawing Sheets

SYSTEM AND METHOD FOR MULTI-SCHEME ALLOCATION OF VIRTUAL RESOURCES IN AN INFORMATION HANDLING SYSTEM

BACKGROUND

Computing devices may provide services. To provide the services, the computing devices may include hardware components and software components. The services provided by the computing devices may be limited by these components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 3.1 shows a flowchart of a method of processing requests for allocating virtual resources based on a base allocation scheme in accordance with one or more embodiments of the invention.

FIG. 3.2 shows a flowchart of a method of allocating a specialized workload in accordance with one or more embodiments of the invention.

FIG. 3.3 shows a flowchart of a method of monitoring, mapping, and allocating virtual resources in a disaster recovery environment in accordance with one or more embodiments of the invention.

FIGS. 4.1-4.3 shows diagrams of the operation of an example system over time in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing information handling systems. Specifically, embodiments of the invention relate to managing requests for installing virtual resources in specialized hardware resources (e.g., graphics processing units (GPUs)) based on a base allocation scheme of the specialized hardware resources. A base allocation scheme may refer to a policy for allocating a virtual resource to a specialized hardware resource based on the availability of the specialized hardware resources. The base allocation scheme may be a breadth-first scheme. The breadth-first scheme allocates virtual resources across the multiple specialized hardware resources such that a virtual resource is installed in a first available hardware resource, and a second virtual resource is installed in a second available hardware resource. In contrast, a depth-first scheme allocates the virtual resources such that the virtual resources are allocated to a specialized hardware resource until the availability of the specialized hardware resource is exhausted before allocating to a second specialized hardware resource. Embodiments of the invention include providing dummy virtual resources that allow the information handling system to implement a second scheme that varies from the implemented base scheme. In this manner, the information handling system is equipped with a multi-scheme allocation system.

Embodiments further relate to systems, devices, and methods for utilizing partitioning capability and aggregation capability of the specialized hardware to allocate a specialized workload to the resources of the information handling system. Utilizing the partitioning capability of the information handling system may provide a reduction of the resource cost of the information handling system so that more specialized workloads may be allocated. Further, utilizing the aggregation capability of the specialized hardware may provide an improvement of the performance of the specialized workload. Further to this, utilizing both the aggregation capability and the partitioning capability would provide a combination of a cost reduction and a performance improvement. Embodiments of the invention may further include monitoring the allocated resources and the performance of the specialized workload to determine if a reallocation is required. The reallocation may include, for example, allocating additional or fewer hardware resources to the specialized resources to either improve the performance of the specialized workload or improve the overall availability of the resources in the information handling system for additional specialized workloads.

Embodiments of the invention further relate to systems, devices, and methods for monitoring, mapping, and allocating virtual resources on a disaster recovery (DR) environment. The monitoring may include obtaining workload information of the virtual resources. The mapping may include assigning a tiered component of the DR environment to each virtual resource. The mapping may be an automatic process performed based on the obtained workload information. Alternatively, the mapping may be a manual process provided by the client utilizing the workload. In such scenarios, the workload information may be used to determine whether the manually-assigned mapping meets the requirements for operation in the DR environment. If any of the virtual resources in the manually-assigned mapping do not meet the requirements, the client is notified. The client may, in response, override the requirements or provide alternative mappings for the virtual resources that did not meet the requirements.

Figure 11:
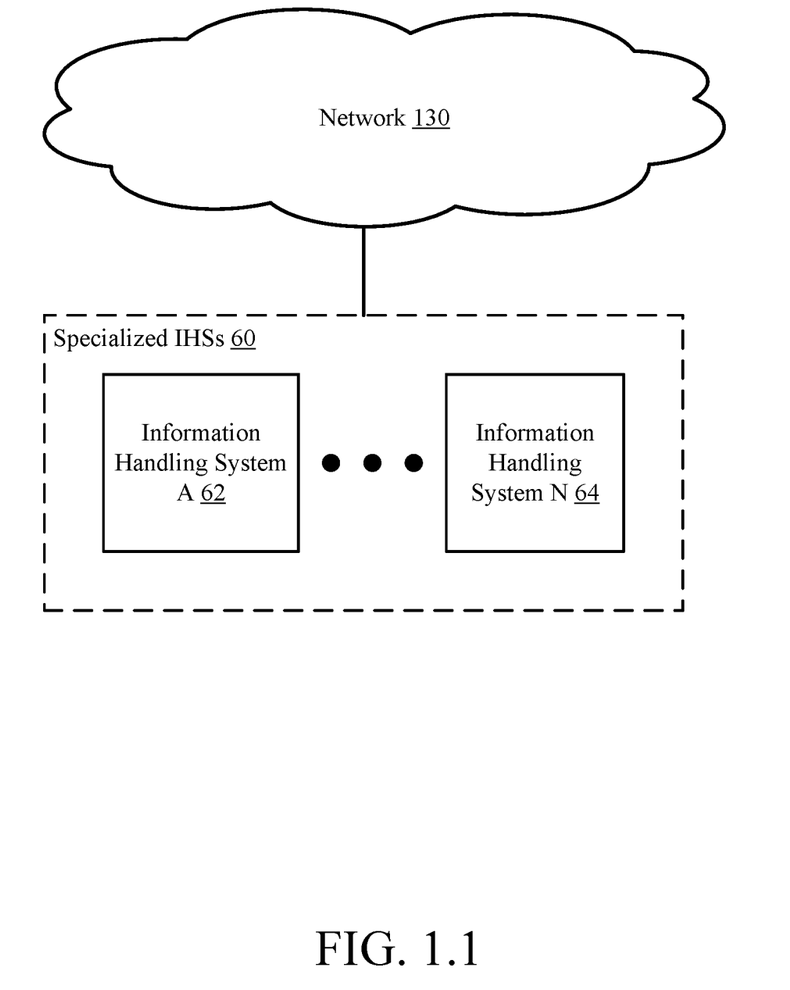

FIG. 1.1 shows a system in accordance with one or more embodiments of the invention. The system may include any number of specialized information handling systems (60). The specialized information handling systems (60) (also referred to as information handling systems or IHSs) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by specialized hardware devices (also referred to as specialized hardware resources). The specialized hardware resources may include, for example, processing resources, storage resources, memory resources, graphics processing resources, communications resources, and/or other types of resources provided by the hardware devices. Various hardware devices may provide these computing resources.

Performing the computer implemented services may result in the generation of data. The data may be may be important to the system and/or a user or the system and may be required to be stored for protection and/or restoration purposes. The data may be stored for other and/or additional purposes without departing from the invention. Storing the data in the hardware devices of the system may be problematic because hardware devices may be unavailable or incapable of storing the data, resulting in inefficiencies in storing data in composed information handling systems.

Figure 33:
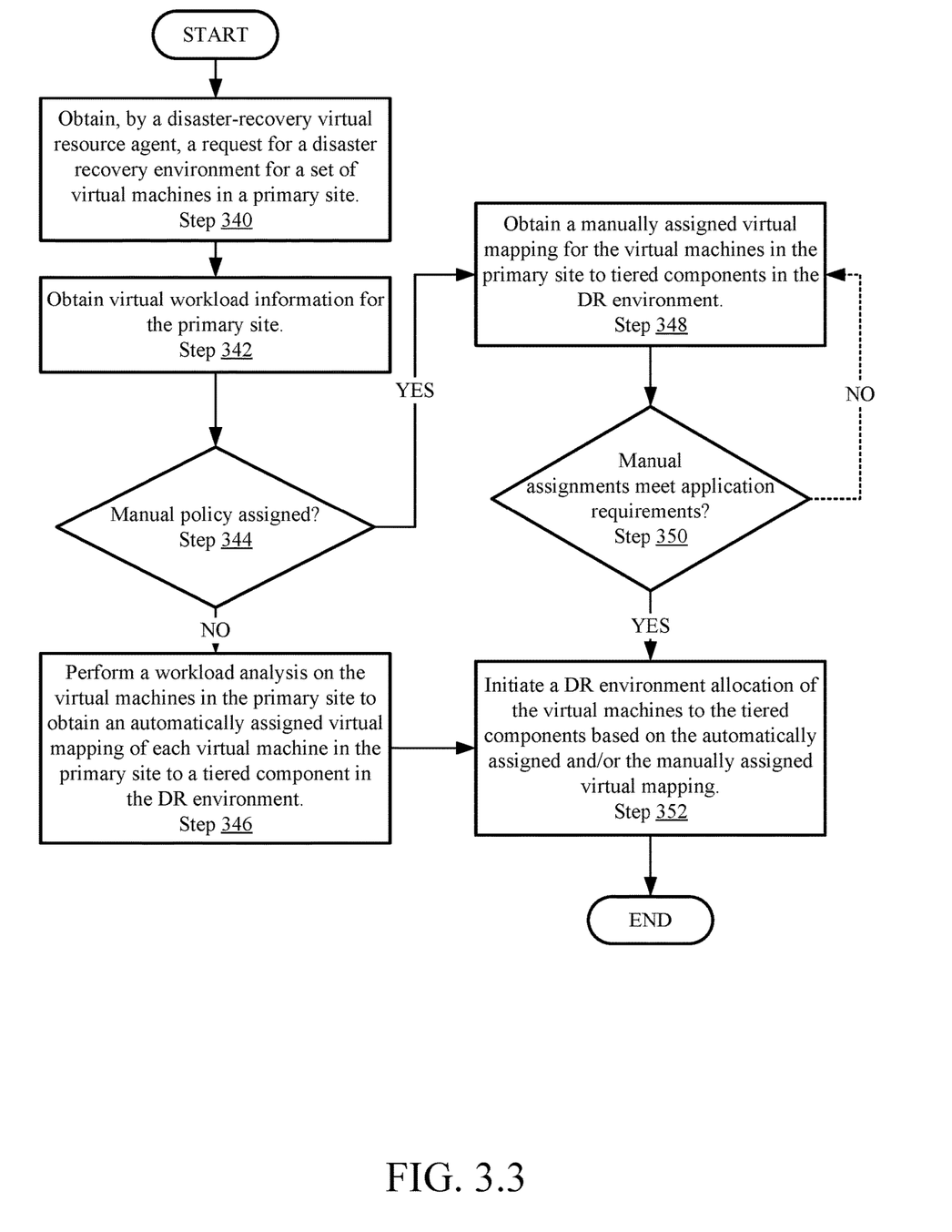

In one or more embodiments of the invention, any of the information handling systems (62, 64) may serve as a primary site for executing virtual resources for clients (not shown). The primary site may be easily accessible for the clients. In contrast, one or more of the information handling systems (62, 64) may operate as a disaster recovery (DR) environment. In one or more embodiments of the invention, the DR environment is a system of components that execute a copy of the virtual resources of a primary site. The DR environment may be available as an alternative environment for the clients should the primary site experience an unexpected failure. Further discussion regarding the DR environment and/or the primary site may be found in, for example, FIG. 3.3.

While the information handling systems (60) have been illustrated and described as including a limited number of specific components, an information handling system in accordance with embodiments of the invention may include additional, fewer, and/or different components without departing from the invention.

While the information handling systems are illustrated throughout the application as a single entity, the information handling systems may each be implemented as a logical entity that includes any number of computing devices (see, e.g., FIG. 5) that execute the functionality of the information handling system (or of the specialized hardware resources) described throughout this application.

Figure 12:
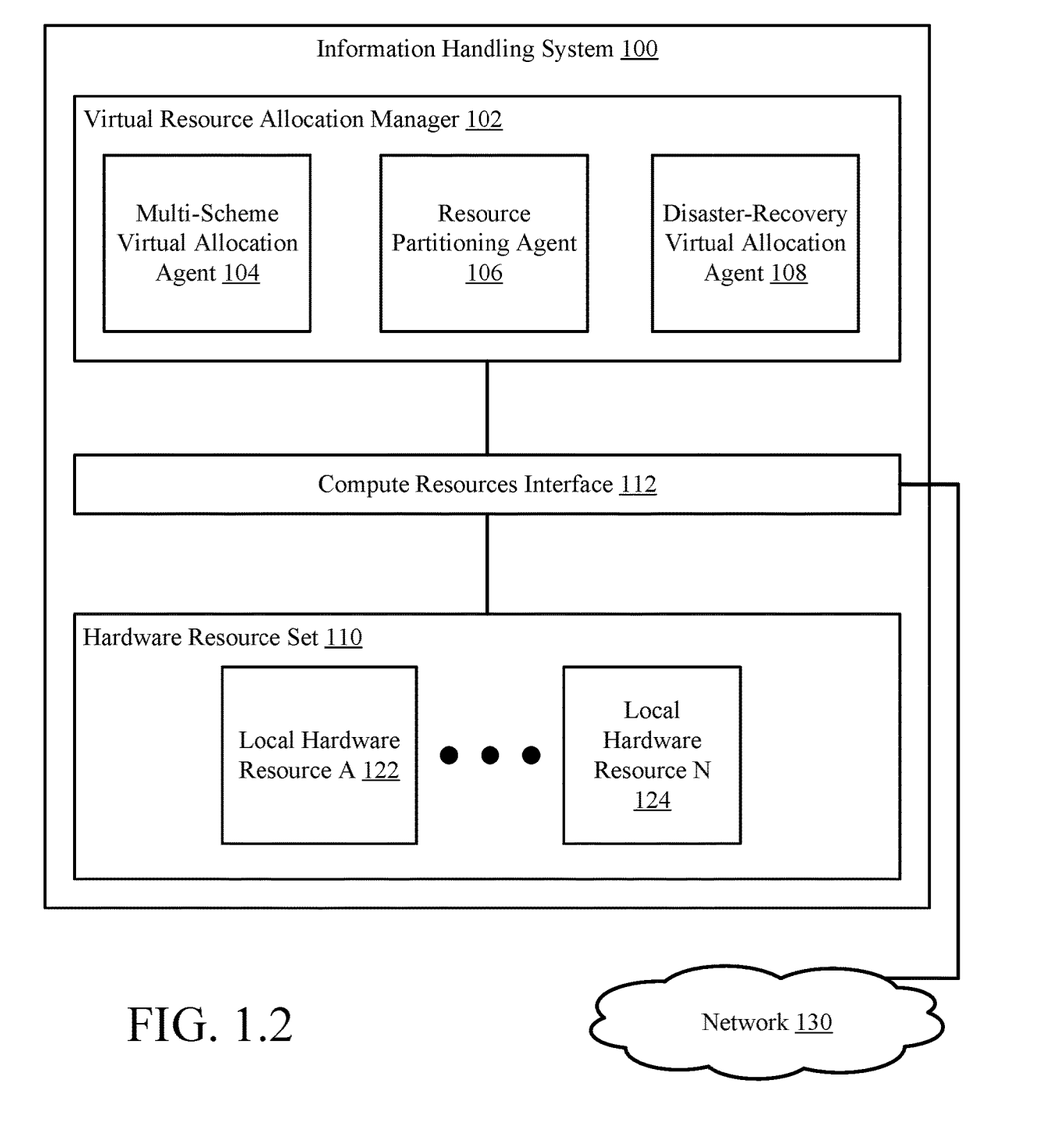

Turning to FIG. 1.2, FIG. 1.2 shows a diagram of an information handling system (100) in accordance with one or more embodiments of the invention. Any of the information handling systems (e.g., 62, 64) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include a virtual resource allocation manager (102). The virtual resource allocation manager (102) may perform resource allocation services to allocate workloads and/or virtual resources to the hardware resource set (110). The virtual resource allocation manager (102) may obtain requests for allocating the virtual resources and/or workloads, and the virtual resource allocation manager (102) may perform various methods for allocating the requested virtual resources and/or workloads to the hardware resource set (110). The such various methods may be those described in FIGS. 3.1-3.3.

The virtual resource allocation manager (102) may include a multi-scheme virtual allocation agent (104) that includes functionality for processing requests in accordance with FIG. 3.1. The virtual resource allocation manager (102) may further include a resource partitioning agent (106) that includes functionality for processing requests in accordance with FIG. 3.2. Finally, the virtual resource allocation manager (102) further includes a DR virtual allocation agent (106) that includes functionality for monitoring, mapping, and allocating virtual resources to a disaster recovery environment in accordance with FIG. 3.3.

The virtual resource allocation manager (102) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 3.1-3.3. The virtual resource allocation manager (102) may be implemented using other types of computing devices without departing from the invention. For additional details regarding computing devices, refer to FIG. 5.

In one or more embodiments of the invention, the information handling system (100) may include a hardware resource set (110). The hardware resource set (110) may include any number and type of hardware devices including, for example, one or more processors, any quantity and type of processor dedicated memory, and any number of local hardware resources (122, 124).

For example, the hardware resource set (110) may include specialized hardware resources (122, 124) operably connected to the virtual resource allocation manager (102) via the compute resources interface (112). The specialized hardware resources (122, 124) may include any number and type of hardware devices that provide computing resources. For additional details regarding the specialized hardware resources (122, 124), refer to FIG. 2.

The compute resources interface (112) may be implemented using any suitable interconnection technology including, for example, system buses such as compute express links or other interconnection protocols. For example, the compute resources interface (112) may be implemented as a peripheral component interconnect express (PCIe) device. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

In some embodiments of the invention, the hardware resource set (110) may be implemented as separate physical devices. In such a scenario, the compute resources interface (112) may include one or more networks enabling these resource sets to communicate with one another. Consequently, any of these resource sets (e.g., 102, 110) may include network interface controllers or other devices to enable the hardware devices of the respective resource sets to communicate with each other.

The network (130) may correspond to any type of network and may be operably connected to the Internet or other networks thereby enabling the information handling system (100) to communicate with any number and type of other devices (e.g., other information handling systems).

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 3.1-3.3. The information handling system (100) may be implemented using other types of computing devices without departing from the invention. For additional details regarding computing devices, refer to FIG. 5.

While the information handling system (100) has been illustrated and described as including a limited number of specific components, an information handling system in accordance with embodiments of the invention may include additional, fewer, and/or different components without departing from the invention.

Figure 2:
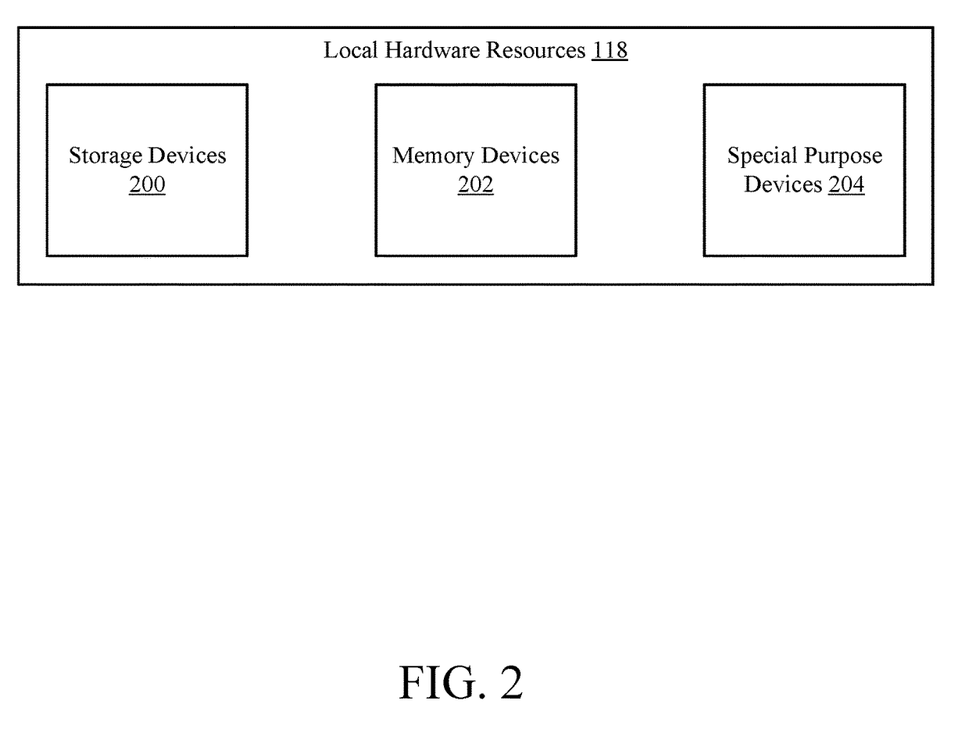
FIG. 2 shows a diagram of local hardware resources in accordance with one or more embodiments of the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The virtual allocation manager or other entities may perform preferential writes of data to the storage devices (200). In other words, the most capable storage device or storage resource of the storage devices (200) may be used to store the data. The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which an information handling system may store data including any type and quantity of information. The memory devices (202) may include any type and quantity of devices for storing data. The devices may include, for example, transitory memory such as random access memory, persistent memory such as enterprise class memory or non-volatile memory express (NVMe) devices, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units (GPUs) for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The manner of operation of these devices i.e., the performance of the aforementioned storage management services, may be transparent to at least a portion of the computing resource sets utilizing these hardware devices for providing computer implemented services. Consequently, even though at least a portion of the resulting composed information handling system control plane may be unaware of the implementation of these models, the composed information handling systems may still operate in accordance with these models thereby managing the storage of data for composed information handling systems.

While the hardware resources (118) have been illustrated and described as including a limited number of specific components, local hardware resources in accordance with embodiments of the invention may include additional, fewer, and/or different components without departing from the invention.

Figure 31:
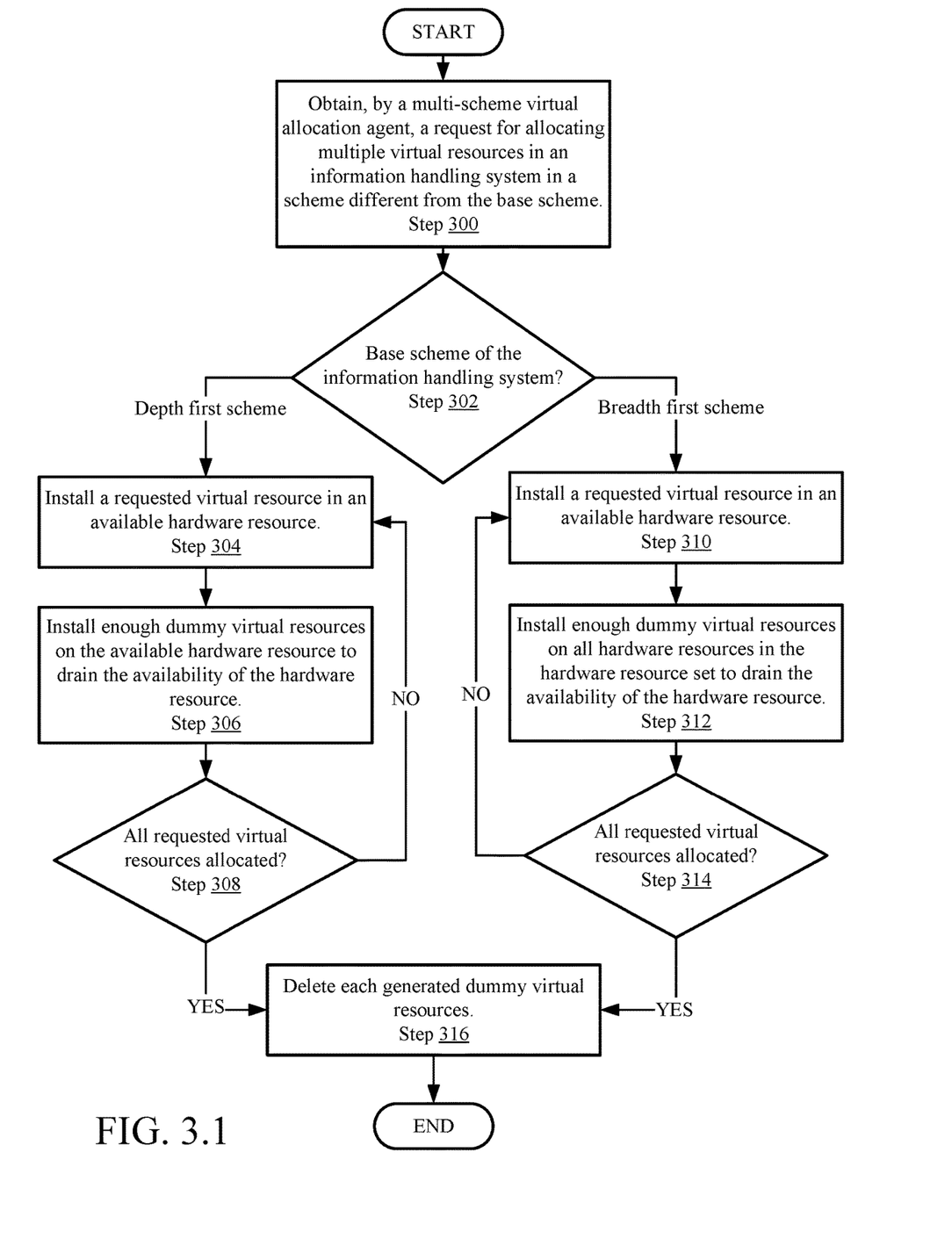

FIG. 3.1 shows a flowchart of a method of processing requests for allocating virtual resources based on a base allocation scheme in accordance with one or more embodiments of the invention. The method shown in FIG. 3.1 may be performed by, for example, a multi-scheme virtual allocation agent (e.g., 104, FIG. 1.2). Other components of the system in FIGS. 1.1-1.2 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

Turning to FIG. 3.1, in step 300, a request is obtained for allocating multiple virtual resources in an information handling system in a scheme that is different from the base scheme. In one or more embodiments, the request is obtained from a client device utilizing the resources of the information handling system.

In one or more embodiments, a base scheme refers to a scheme implemented by a processor of the information handling system for allocating virtual resources to the specialized hardware resources. The base scheme may be a breadth-first scheme. The breadth first scheme may include allocating the virtual resources such that the burden of the allocation is distributed across the specialized hardware resources in the information handling system. In contrast, a depth-first scheme may include allocating the virtual resources such that the burden of the allocation is concentrated on each specialized hardware resource. The request may specify the allocation scheme desired to be used for the virtual resources. For example, the request may specify one or both of the allocation schemes without departing from the invention.

In one or more embodiments of the invention, steps 302-316 are performed for the virtual resources that are requested to be allocated in an allocation scheme that is different from the base scheme of the information handling system. For such virtual resources that the requested allocation scheme is the same as the base scheme, the virtual resources are allocated in accordance with the base scheme (e.g., breadth-first or depth-first).

In step 302, a determination is made about whether a base scheme of the information handling system is a breadth-first scheme or a depth-first scheme. If the base scheme is a depth-first scheme, the method proceeds to step 304; otherwise, the method proceeds to a breadth-first scheme.

In step 304, following the determination that the base scheme is depth-first and the requested set of virtual resources are requested to be in a breadth-first scheme, a first requested virtual resource is installed in an available hardware resource. The virtual resource may be, for example, a virtual GPU. The specialized hardware resource may be, for example, a GPU.

In step 306, enough dummy virtual resource are installed in the hardware resource such that the next available hardware resource is the hardware resource that would be available if the allocation scheme would have been a breadth-first scheme. In this manner, the next virtual resource to be installed, if any remain, would be installed in a second available specialized hardware resource.

In step 308, a determination is made about whether all requested virtual resources are allocated. If all requested virtual resources are allocated, the method proceeds to step 316; otherwise, the method proceeds to step 304.

In step 310, following the determination that the base scheme is breadth-first and the requested set of virtual resources are requested to be in a depth-first scheme, a first requested virtual resource is installed in an available hardware resource. The virtual resource may be, for example, a virtual GPU. The specialized hardware resource may be, for example, a GPU.

In step 312, a dummy virtual resource is installed in each of the remaining available hardware resources such that the next available hardware resource is the hardware resource that would have been available if the base scheme was a depth-first scheme. In this manner, the next virtual resource to be installed, if any remain, would be installed in the first available resource of step 310.

In step 314, a determination is made about whether all requested virtual resources are allocated. If all requested virtual resources are allocated, the method proceeds to step 316; otherwise, the method proceeds to step 310.

In step 316, each generated dummy virtual resource of steps 306 or 312 are deleted. The installation of the virtual resources requested in step 300 may be complete following step 316.

Figure 32:
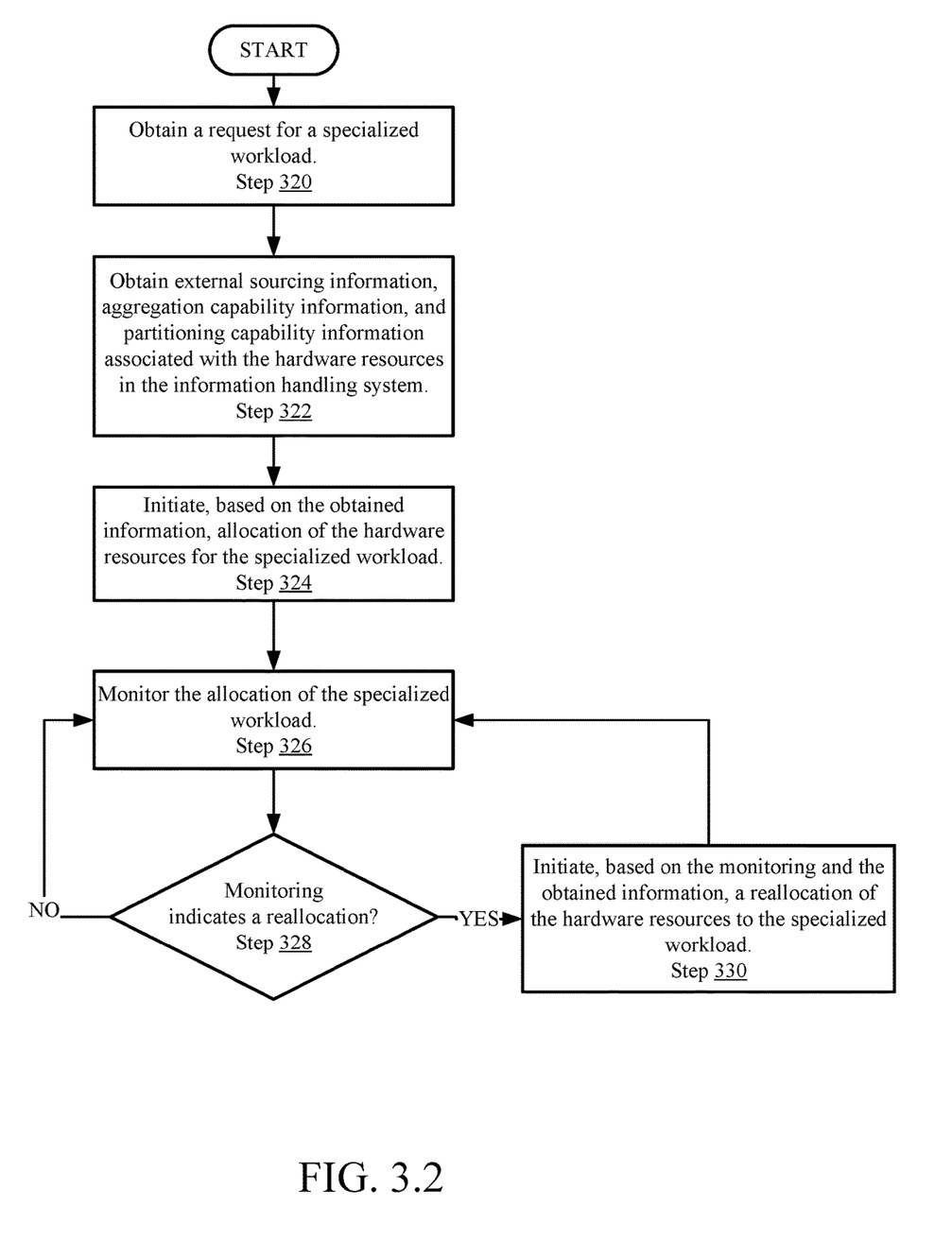

FIG. 3.2 shows a flowchart of a method of allocating a specialized workload in accordance with one or more embodiments of the invention. The method shown in FIG. 3.2 may be performed by, for example, a resource partitioning agent (e.g., 106, FIG. 1.2). Other components of the system in FIGS. 1.1-1.2 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 320, a request for a specialized workload is obtained. The specialized workload may be for a workload that is to be performed by the specialized hardware resources. For example, the specialized workload may be for a virtual desktop interface (VDI), a computer vision (CV) workload, a data analytics (DA) workload, and/or other machine learning training.

In one or more embodiments of the invention, the virtual desktop interface relates to a software that provides a desktop environment to a client device that separates the desktop environment from the client device from which the desktop is accessed. In one or more embodiments of the invention, the CV is a type of machine learning training that is performed on images and/or videos (e.g., obtained from a camera) to better understand objects and/or entities in the images. In one or more embodiments of the invention, the DA workload is a processing of large amounts of data. Such workload may be optimal for a component such as, for example, a GPU.

In step 322, external sourcing information, aggregation capability information, and partitioning capability information associated with the specialized hardware resources of the information handling system is obtained. In one or more embodiments of the invention, the external sourcing information includes information regarding the benchmark information of the specialized hardware resources. The benchmark information may be obtained from a vendor of the specialized hardware resources. The benchmark information may specify standard industry-specific capabilities for the GPUs. In one or more embodiments of the invention, the aggregation capability information includes network connectivity capabilities between the specialized hardware resources, network latency between the specialized hardware resources, whether a switch chip is installed to connect the GPUs of the specialized hardware resources, and/or any other aggregation information corresponding to the specialized hardware resources without departing from the invention. In one or more embodiments of the invention, the partitioning capability information specifies the capability of each of the specialized hardware resources for partitioning the resources for multiple workloads. The partitioning capability information may specify, for example, temporal sharing capability, time sliced sharing capability, spatial non-time-sliced sharing, virtual GPU capability, and/or any other capability information without departing from the invention.

In step 324, based on the obtained external sourcing information, the aggregation capability information, and partitioning capability information, the specialized workload is allocated to a set of the specialized hardware resources. The allocation includes selecting the set of specialized hardware resources using the obtained information and installing the requested software of the specialized workload (e.g., VDI, CV, DA, etc.) to the selected set.

In step 326, the allocation of the specialized workload is monitored. In one or more embodiments of the invention, the specialized workload is monitored to observe the performance of the specialized workload. The performance may be used to determine whether too many specialized resources are allocated to the specialized workload or whether not enough resources are allocated. If either too many resources or not enough resources are allocated, the monitoring may indicate a reallocation.

In step 328, a determination is made about whether a reallocation is required. If a reallocation is required, the method proceeds to step 330; otherwise, the method proceeds to step 326.

In step 330, a reallocation is initiated. In one or more embodiments of the invention, the performance monitored in step 326 is utilized with the obtained information of step 322 to select a second set of specialized hardware resources. The second set may include additional and/or fewer resources than the previous iteration of the set of specialized hardware resources.

FIG. 3.3 shows a flowchart of a method of monitoring, mapping, and allocating virtual resources in a disaster recovery environment in accordance with one or more embodiments of the invention. The method shown in FIG. 3.3 may be performed by, for example, a DR virtual allocation agent (e.g., 108, FIG. 1.2). Other components of the system in FIGS. 1.1-1.2 may perform all, or a portion, of the method of FIG. 4.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 340, a request for a disaster recovery environment is obtained. The request specifies providing the disaster recovery (DR) environment for a primary site that includes a set of virtual resources. The virtual resources may include, for example, virtual machines (VMs). The request may further include a manually assigned virtual mapping without departing from the invention.

In step 342, virtual workload information is obtained for the primary site. The virtual workload information includes utilization information corresponding to the virtual resources on the primary site. The primary site may include specialized hardware resources. The virtual resources may execute on the specialized hardware resources. The specialized hardware resources may include, for example, high capability GPUs.

The virtual workload information may include a list of applications executing on each of the virtual resources. The virtual workload information may further include performance information corresponding to each of the virtual resources on the respective specialized hardware resource(s). The virtual workload information may be obtained by monitoring the primary site over a predetermined period of time to obtain the relevant performance information and/or list of applications.

In step 344, a determination is made about whether a manual policy is assigned. The manual policy may refer to a policy implemented by the DR virtual resource agent that specifies whether the mapping of the virtual resources is to be obtained manually (e.g., from a user of the client utilizing the virtual resources). If the manual policy is assigned, the method proceeds to step 348; otherwise, the method proceeds to step 346.

In step 346, following the determination that a manual policy is not assigned, a workload analysis is performed on the virtual resources in the primary site to obtain an automatically assigned virtual mapping. In one or more embodiments of the invention, the automatically assigned virtual mapping includes analyzing the virtual workload information of each virtual resource to determine a tiered component to assign to the DR environment. In one or more embodiments of the invention, a tiered component is a component of the DR environment on which a DR virtual resource is to execute. The DR virtual resource may be, for example, a copy of the virtual resource.

The tiered components may be categorized based on its capability relative to the specialized hardware resources of the primary site. For example, a first tiered component may be a highly capable GPU similar to the specialized hardware resources. The first tiered component may be identical in terms of capability, but may be costly to operate (e.g., in terms of monetary costs and/or in terms of computing resources). As a second example, a second tiered component may be a lower capability GPU. The lower capability may include significantly fewer number of cores compared to the highly capable GPU. As a third example, a third tiered component may include virtual memory devices that provide less execution capability than the first tiered component or the second tiered component. Finally, as a fourth example, a fourth tiered component may include a central processing unit (CPU) that provides less processing capability than the first three tiered components. Each virtual resource in the primary site may be mapped to one of the four tiered components based on the corresponding virtual workload information.

In step 348, following the determination that the manual policy is assigned, the manually assigned virtual mapping is obtained for the virtual resources in the primary site to the tiered components in the DR environment. In one or more embodiments of the invention, the manually assigned virtual mapping is obtained from the client. The manually assigned virtual mapping is generated by a user of the client that determines the preferred mapping for the virtual resources.

In step 350, a determination is made about whether the manually assigned virtual mapping (also referred to as manual assignments) meets application requirements. In one or more embodiments of the invention, the application requirements are a set of conditions for which the tiered components are to meet for a virtual resource to be assigned to the tiered component. For example, consider a scenario in which an application requirement specifies that a virtual resource that executes a particular application is to be mapped to a highly capable GPU. Further, consider the fact that the manually assigned virtual mapping specifies the virtual resource to a lower capability resource such as, for example, a CPU. In this scenario, the manually assigned virtual mapping does not meet the application requirements. Other conditions may be specified in the application requirements without departing from the invention.

If the manual assignments meet the application requirements, the method proceeds to step 352. In such scenarios in which the manual assignments do not meet the application requirements, an override request is sent to the client. The override request may specify which virtual resources in the manual assignments do not meet the application requirements, which application requirements are not met, and whether the client wishes to continue with the same manual assignments (i.e., override the application requirements), or whether the client wishes to provide additional manual requirements based on the provided information. An override response may be obtained from the client that specifies either: (i) to override the application requirements and maintain the manual assignments, or (ii) a new set of manual assignments. In this manner, the method proceeds to step 348, where the manually assigned virtual mapping is obtained.

In step 352, following the generation and/or obtaining of an automatically assigned virtual mapping or a manually assigned virtual mapping, the DR environment is initiated that includes installing the DR virtual resources that each correspond to a virtual resource of the primary site to a tiered component of the DR environment. The installation may result in a DR environment that is substantially similar to the primary site.

To further clarify embodiments of the invention, three non-limiting examples are provided in FIGS. 4.1-4.3. FIG. 4.1 shows a first example, FIG. 4.2 shows a second example, and FIG. 4.3 shows a third example. For the sake of brevity, only a limited number of components of the system of FIG. 1.1 is illustrated in FIGS. 4.1-4.3.

Example 1

Figure 41:
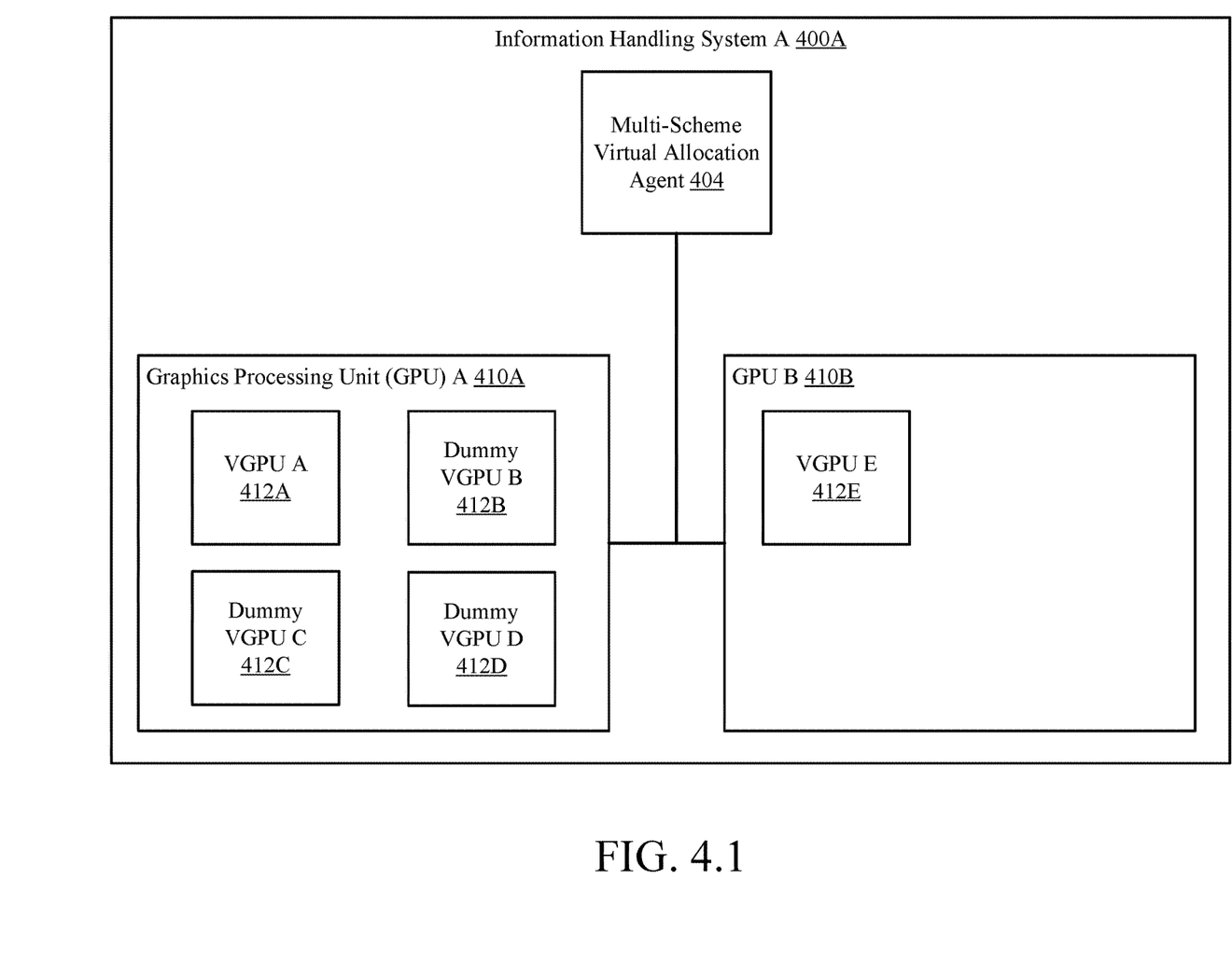

Turning to the example, information handling system A (400A) includes a multi-scheme virtual allocation agent (400). The multi-scheme virtual allocation agent (404) enables the information handling system (400A) to allocate requested virtual resources in multiple schemes. In this example, the base scheme implemented by the information handling system (400A) is a depth-first scheme. Said another way, without the implementation of the multi-scheme virtual allocation agent (404), the virtual resources would be allocated to an information handling system such that the resources of a first GPU (e.g., GPU A (410A)) would be exhausted before allocating virtual resources to a second GPU (e.g., GPU B (410B)).

At a first point in time, a client sends a request to allocate two virtual GPUs (VGPU A (412A), VGPU E (412E)) to the information handling system (400A). At this point, no virtual GPUs have been installed in the GPUs (410A, 410B). Further, each GPU (410A, 410B) is capable of installing up to four virtual GPUs. The request specifies the virtual GPUs (412A, 412E) to be allocated in a breadth-first scheme. Said another way, the requested allocation scheme includes distributing the virtual GPUs (412A, 412E) across the two GPUs (410A, 410E). Because the information handling system (400A) implements a base scheme (e.g., depth-first) that is different from the requested allocation scheme (i.e., breadth-first), the multi-scheme virtual allocation agent (404) performs the method of FIG. 3.1 to perform the allocation in accordance with the requested allocation scheme. Specifically, the first VGPU (412A) is installed in GPU A (410A). Following the installation of VGPU A (410A), in order to prevent VGPU E (412E) from being installed on GPU A (410A), a set of three dummy VGPUs (412B, 412C, 412D) are installed in accordance with the depth-first scheme so that the capability of GPU A (410A) is exhausted. In this manner, VGPU B (410B) is installed in GPU B (410B) following the requested breadth-first scheme. After the installation of VGPU E (412E), the three dummy GPUs (e.g., VGPU B (412B), VGPU C (412C), VGPU D (412D)) are deleted.

End of Example 1

Example 2

Figure 42:
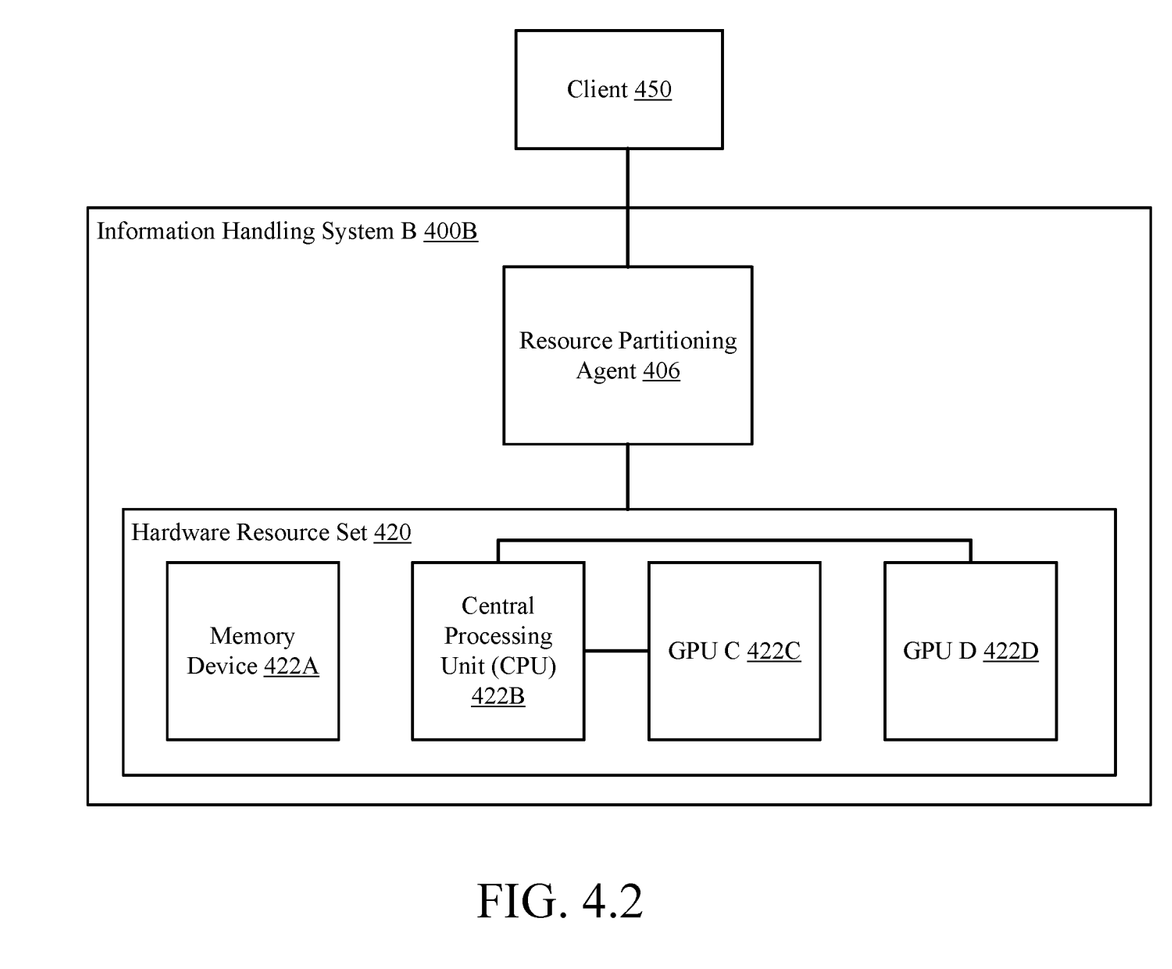

Turning to FIG. 4.2, a client (450) communicates with a resource partitioning agent (406) of information handling system B (400B) that includes a set of hardware resources (420). The client sends a request for a specialized workload that includes providing VDI workload capabilities to the client (450). The resource partitioning agent (406), in response to obtaining the request, obtains aggregation capability information from each resource in the hardware resource set (420). The resources include a memory device (422A), a CPU (422B), and GPUs C (422C) and D (422D). The aggregation capability information includes identifying that the CPU (422B) is directly connected to GPU C (422C) and GPU D (422D). Further, partitioning capability information is obtained that specifies the spatial non-time-sliced partitioning capabilities of GPUs C (422C) and D (422D).

Using the obtained information, the resource partitioning agent (406) selects the CPU (422B), GPU C (422C), and GPU D (422D) for the allocation of the specialized workload.

End of Example 2

Example 3

Figure 43:
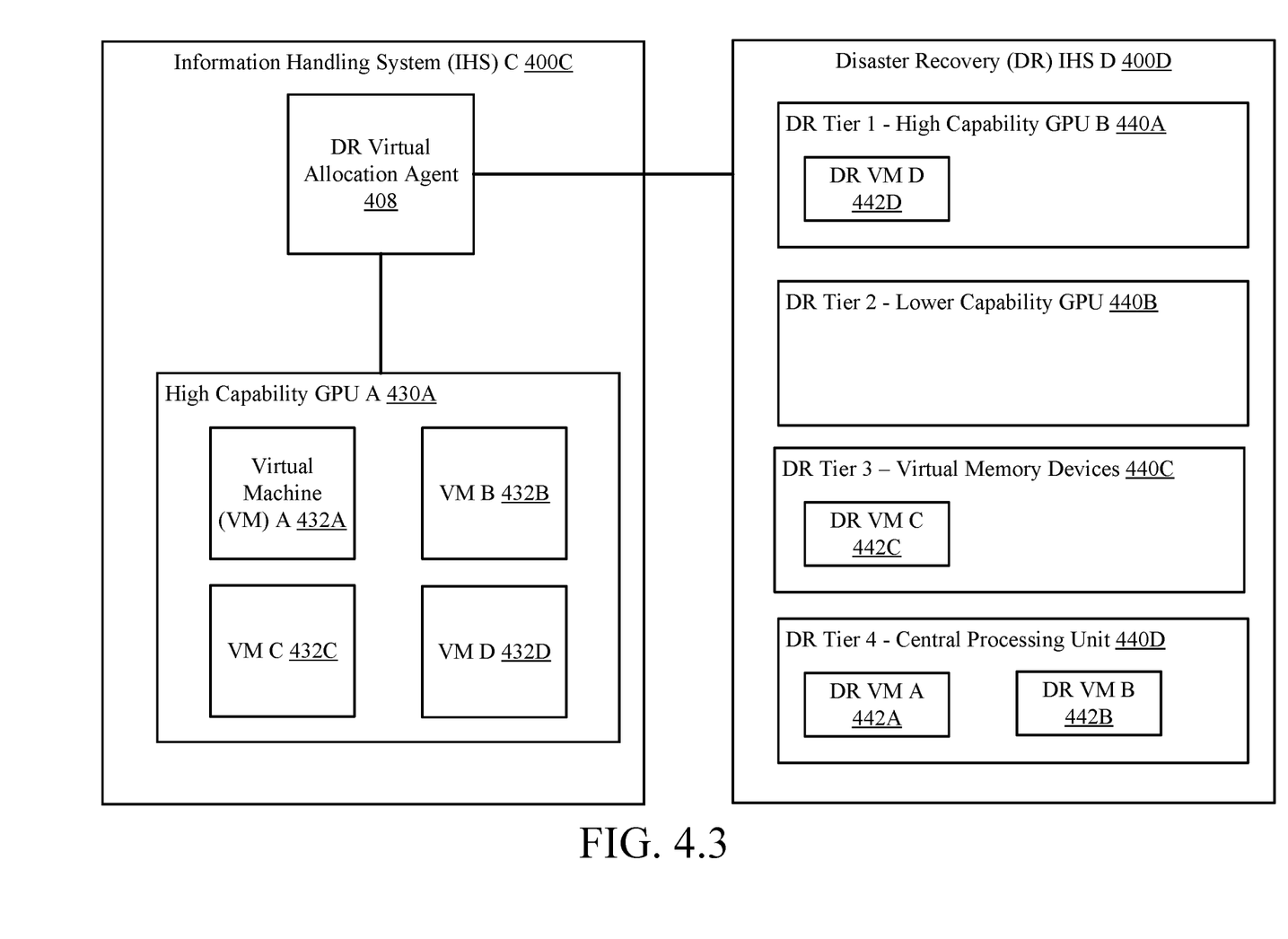

Turning to the example, in FIG. 4.3, information handling system C (400C) operates as a primary site for a client. IHS C (400C) includes a DR virtual allocation agent (408) that manages the primary site, which includes high capability GPU A (430A) that executes four virtual machines (VMs) (VM A (432A), VM B (432B), VM C (432C), and VM D (432D)). Each VM (432A, 432B, 432C, 432D) executes a set of applications. Each application may require performance capability of the underlying hardware (e.g., the high capability GPU (430A)) to operate properly. The performance metrics of the applications in the VMs (432A, 432B, 432C, 432D) may be monitored by the DR virtual allocation agent (408). A client (not shown) may request installing a disaster recovery environment on a second IHS. The second IHS (400D) may include four tiered components: DR tier 1 includes another high capability GPU (440A), DR tier 2 includes a lower capability GPU (440B), DR tier 3 includes a set of virtual memory devices (440C), and DR tier 4 includes a CPU (440D).

The DR virtual allocation agent (408) may utilize the obtained performance metrics to assign each VM (432A, 432B, 432C, 432D) to one of the four tiered components (440A, 440B, 440C, 440D). The result is an automatically assigned virtual mapping of the VMs (432A, 432B, 432C, 432D) to a tiered component (440A, 440B, 440C, 440D) of the DR environment (400D). The automatically assigned virtual mapping specifies assigning VM A (432A) and VM B (432B) to DR tier 4 (440D), VM C (432C) to DR tier 3 (440C) and VM D (432D) to DR tier 1 (440A).

Following the mapping of the VMs (432A, 432B, 432C, 432D), the allocation is initiated. The allocation includes generating a copy of each of the VMs (432A, 432B, 432C, 432D) and installing the copies of the VMs in the DR environment (400D). This includes installing DR VM D (442D), which is a copy of VM D (432D), in high capability GPU B (440A); installing DR VM C (442C), which is a copy of VM C (432C) in the virtual memory devices (440C); and installing DR VM A (442A) and DR VM B (442B), which are copies of VM A (432A) and VM B (432B), respectively, in the CPU (440D).

End of Example 3

Figure 5:
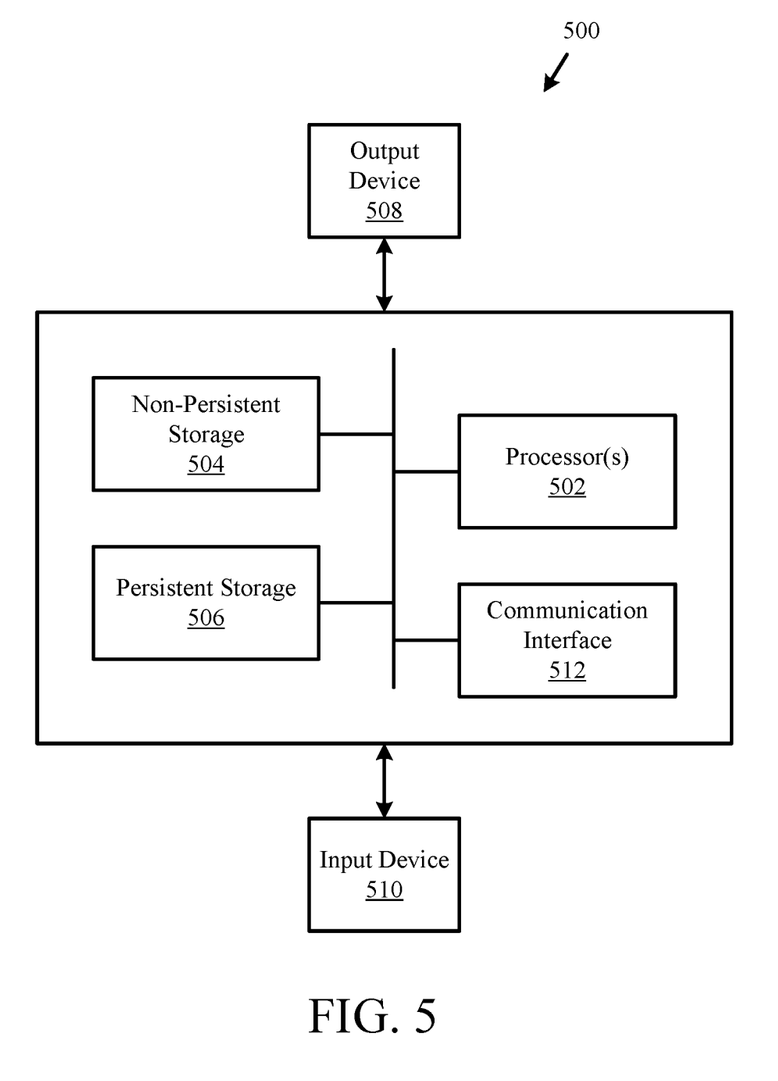
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for performing allocation of virtual resources in an information handling system. Specifically, embodiments of the invention provide multiple schemes of allocation for the virtual environment by implementing dummy virtual resources that are applied in accordance with a base scheme. By installing the dummy virtual resources, embodiments of the invention provide alternative schemes for allocation that may be preferable to the user of the client device.

Embodiments of the invention may further provide allocation of specialized workloads such as VDI, CV, or other workloads that may be monitored to optimize the partitioning capability and aggregation capability of the specialized hardware resources. For example, by considering the partitioning capability during allocation, embodiments of the invention may reduce the resource burden of the information handling system. Further, by considering the aggregation capability during the allocation, embodiments of the invention may optimize the performance of the workload. Optimizing both the performance of the specialized workload and the burden applied to the information handling system may improve the overall operation of the information handling system.

Embodiments of the invention may further provide an optimal disaster recovery environment that considers both the requirements of the virtual resources while optimizing the computing burden applied on the disaster recovery environment. Reducing the computing burden of the DR environment may be beneficial to the client as this may reduce the cost incurred on the client.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing specialized hardware resources, the method comprising:
obtaining, by a multi-scheme virtual allocation agent, a request for allocating a plurality of virtual resources to the specialized hardware resources in an information handling system,
wherein the request specifies a first scheme of allocation,
wherein the information handling system operates in a second scheme of allocation that is different from the first scheme of allocation;

in response to the request:
  installing a first virtual resource of the plurality of virtual resources on a first specialized hardware resource of the specialized hardware resources;
  performing a dummy virtual resource installation to install a plurality of dummy virtual resources based on the second scheme;
  installing a second virtual resource of the plurality of virtual resources on a second specialized hardware resource of the specialized hardware resources based on the second scheme; and
  deleting the plurality of dummy virtual resources from the hardware resources.

2. The method of claim 1,
wherein the first scheme is a breadth-first scheme,
wherein the second scheme is a depth-first scheme,
wherein performing the dummy variable resource installation comprises:
  installing the plurality of dummy virtual resources on the first specialized resource in the depth-first scheme until the first specialized resource is not available for additional allocation; and
  installing the second virtual resource in the second specialized hardware resource based on the first specialized resource not being available for additional allocation.

3. The method of claim 1,
wherein the first scheme is a depth-first scheme,
wherein the second scheme is a breadth-first scheme,
wherein performing the dummy variable resource installation comprises:
  installing the plurality of dummy virtual resources across each of the plurality of specialized resources such that the next available hardware resource is the first specialized resource based on the breadth-first scheme; and
  installing the second virtual resource in the first specialized resource.

4. The method of claim 3, wherein the second specialized hardware resource is the first specialized hardware resource.

5. The method of claim 1, wherein the specialized hardware resources comprise graphics processing units (GPUs).

6. The method of claim 5, wherein the plurality of virtual resources comprises a plurality of virtual GPUs executing on at least one of the GPUs.

7. A non-transitory computer readable medium comprising computer readable program code, which when executed by a computer processor enables the computer processor to perform a method for managing storage of data in composed information handling systems, the method comprising:
  obtaining, by a multi-scheme virtual allocation agent, a request for allocating a plurality of virtual resources to the specialized hardware resources in an information handling system,
    wherein the request specifies a first scheme of allocation,
    wherein the information handling system operates in a second scheme of allocation that is different from the first scheme of allocation;
  in response to the request:
    installing a first virtual resource of the plurality of virtual resources on a first specialized hardware resource of the specialized hardware resources;
    performing a dummy virtual resource installation to install a plurality of dummy virtual resources based on the second scheme;
    installing a second virtual resource of the plurality of virtual resources on a second specialized hardware resource of the specialized hardware resources based on the second scheme; and
    deleting the plurality of dummy virtual resources from the hardware resources.

8. The non-transitory computer readable medium of claim 7,
wherein the first scheme is a breadth-first scheme,
wherein the second scheme is a depth-first scheme,
wherein performing the dummy variable resource installation comprises:
  installing the plurality of dummy virtual resources on the first specialized resource in the depth-first scheme until the first specialized resource is not available for additional allocation; and
  installing the second virtual resource in the second specialized hardware resource based on the first specialized resource not being available for additional allocation.

9. The non-transitory computer readable medium of claim 7,
wherein the first scheme is a depth-first scheme,
wherein the second scheme is a breadth-first scheme,
wherein performing the dummy variable resource installation comprise:
  installing the plurality of dummy virtual resources across each of the plurality of specialized resources such that the next available hardware resource is the first specialized resource based on the breadth-first scheme; and
  installing the second virtual resource in the first specialized resource.

10. The non-transitory computer readable medium of claim 9, wherein the second specialized hardware resource is the first specialized hardware resource.

11. The non-transitory computer readable medium of claim 7, wherein the specialized hardware resource comprises graphics processing units (GPUs).

12. The non-transitory computer readable medium of claim 11, wherein the plurality of virtual resources comprises a plurality of virtual GPUs executing on at least one of the GPUs.

13. A system, comprising:
  a processor; and
  memory comprising instructions, which when executed by the processor, cause the processor to perform a method, the method comprising:
    obtaining, by a multi-scheme virtual allocation agent, a request for allocating a plurality of virtual resources to the specialized hardware resources in an information handling system,
      wherein the request specifies a first scheme of allocation,
      wherein the information handling system operates in a second scheme of allocation that is different from the first scheme of allocation;
    in response to the request:
      installing a first virtual resource of the plurality of virtual resources on a first specialized hardware resource of the specialized hardware resources;
      performing a dummy virtual resource installation to install a plurality of dummy virtual resources based on the second scheme;
      installing a second virtual resource of the plurality of virtual resources on a second specialized hardware resource of the specialized hardware resources based on the second scheme; and deleting the plurality of dummy virtual resources from the hardware resources.

14. The system of claim 13, wherein the first scheme is a breadth-first scheme, wherein the second scheme is a depth-first scheme, wherein performing the dummy variable resource installation comprises:

installing the plurality of dummy virtual resources on the first specialized resource in the depth-first scheme until the first specialized resource is not available for additional allocation; and installing the second virtual resource in the second specialized hardware resource based on the first specialized resource not being available for additional allocation.

15. The system of claim 13, wherein the first scheme is a depth-first scheme, wherein the second scheme is a breadth-first scheme, wherein performing the dummy variable resource installation comprises:

installing the plurality of dummy virtual resources across each of the plurality of specialized resources such that the next available hardware resource is the first specialized resource based on the breadth-first scheme; and installing the second virtual resource in the first specialized resource.

16. The system of claim 15, wherein the second specialized hardware resource is the first specialized hardware resource.

17. The system of claim 13, wherein the specialized hardware resources comprise graphics processing units (GPUs).

* * * * *